No Printed Specification Available
J. HALE.
6498X
Washing Machine.
Patented Apr. 20, 1831.
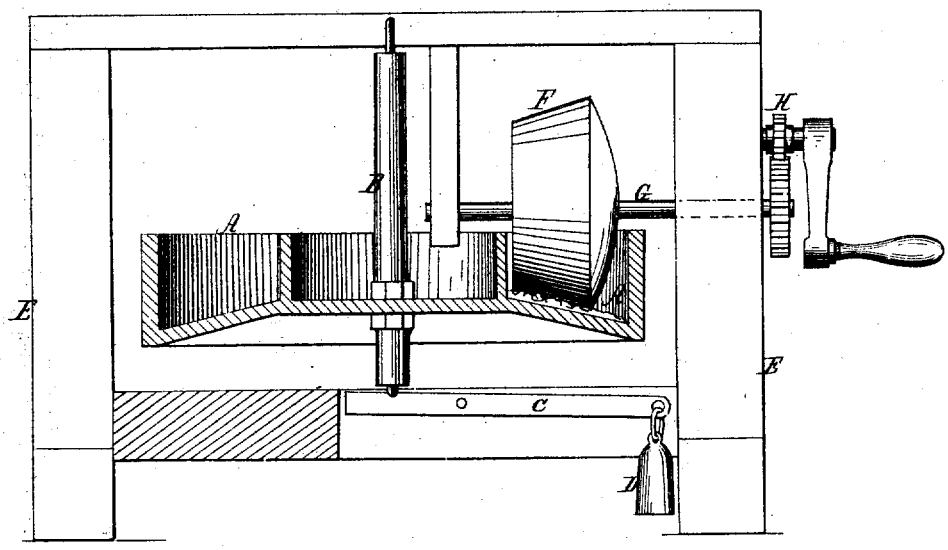
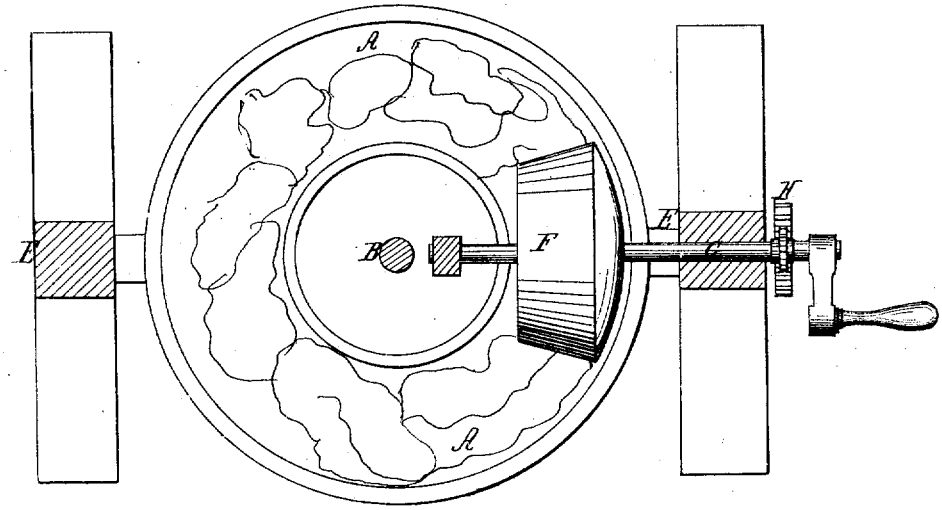
THE NORRIS PETERS CO., PHOTO-LITHO., WASHINGTON, D. C.

John Hale. 6498x
Letters Patent.

The schedule referred to in these Letters Patent, and making part of the same, containing a description in the words of the said John Hale himself of his improvement in the washing machine —

Be it known that I the said John Hale have invented, constructed, made and applied to use, a new and useful improvement in the washing machine called Hales improved washing machine, which I specify in the following manner. Without particularizing on the frame as it will be sufficiently described in course, I begin with the tub, which is an angular tub. It is about three and a half feet diameter, eight inches deep at its exterior periphery, and about five inches deep at its interior periphery. the inclination being in the bottom. The distance between the two peripheries is about nine inches. There is an arbor in the centre of the annular tub, on which the tub easily revolves horizontally. The lower pivot of the arbor plays on its point in the end of a lever of the first order, about six inches from the fulcrum when the power applied is a weight, or on a lever of the second order when the power is a spring; so that by a weight, or spring, the annular tub can be raised or lowered. The said lever is fitted horizontally in a long mortise or slit made in the beam of the frame, which beam is framed into two posts about three and a half feet high — On the top of the posts is another beam through the center of which is a pivot hole which receives the upper pivot of the arbor of the tub. This pivot is long so that the tub may rise up, or lower down, a small distance while it is revolving, so that it may be kept close to the washer that plays in the tub and causes it to revolve — The washer is the frustrum of a cone about eighteen inches in diameter, and of such length as may revolve in the annular tub freely and easily. The washer is made fast on an arbor, one end of which revolves in a pivot hole made in one of the said posts about nine inches above the bottom of the tub when it is at its highest position. The other end of the arbor with a pivot on it revolves in the end of a stud descending from the lower side of the upper beam, so that the arbor is supported in a horizontal position. The washer is made to revolve by a dentated wheel made fast on the outer end of its arbor; this is driven by a pinion of half its diameter. On the ar-bor of the pinion is a crank by which the machine is put in motion. The two posts are framed into feet, on sills at the bottom sufficiently long to support the machine firmly --

Those parts and properties of the above described machine which I claim as my invention, and for which letters Patent are requested, on the annu-lar form of the tub, with its advantages of rising and lowering according to the irregular thickness of the clothes spread therein to be washed, and the advantages obtained by retarding the speed of the washer, which facilitates the operation. In testimony that the above is a true specification of my said improvement I have hereunto set my hand and and seal this sixth day of April in the year of our Lord one thousand eight hundred and thirty-one -- --

John Hale (L.S.)

Witness
John Dwight
Augustus Peabody

[illegible]

[67 wds